UNITED STATES PATENT OFFICE.

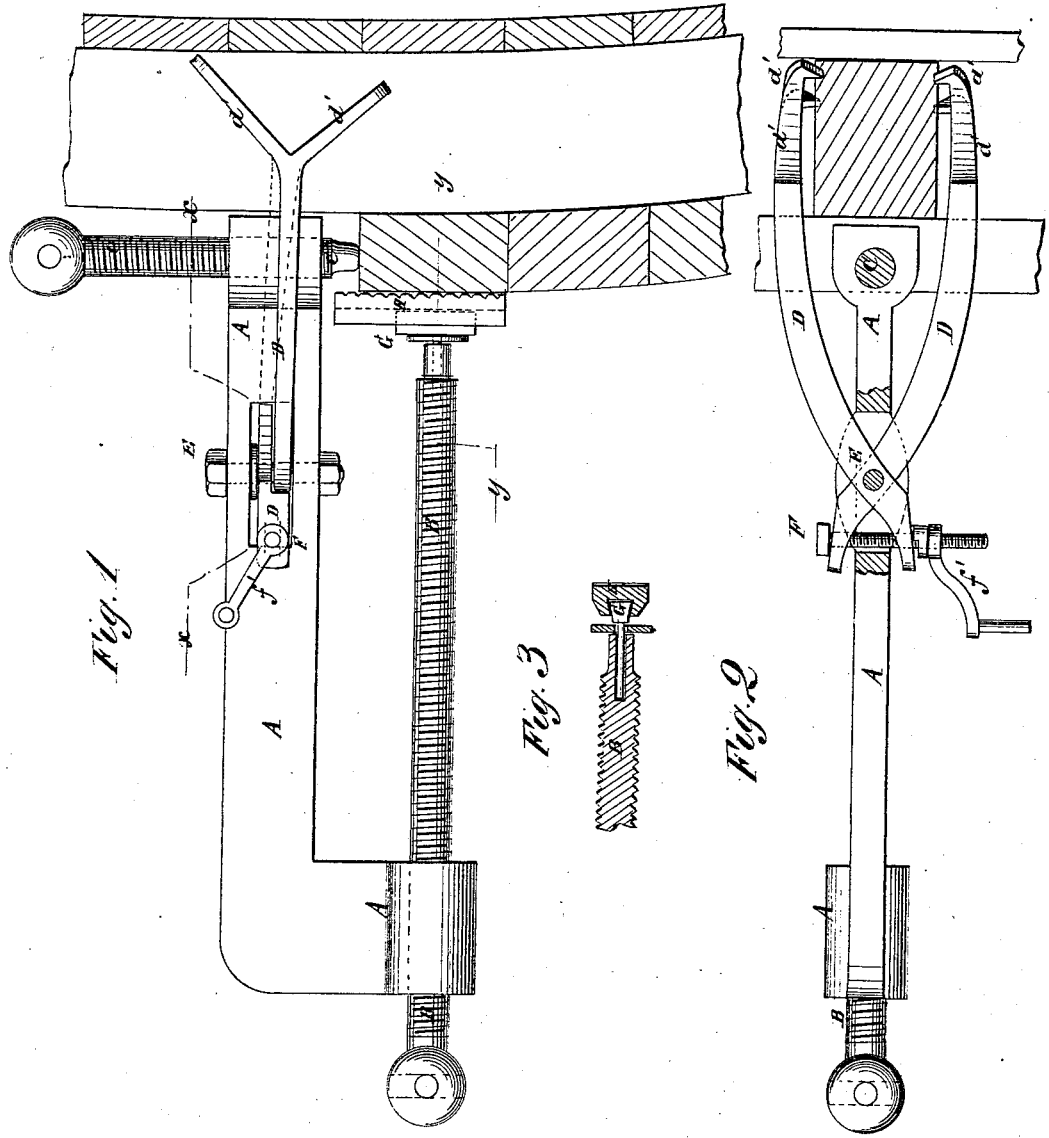

JAMES HASTINGS, OF ELIZABETHPORT, NEW JERSEY.

IMPROVEMENT IN PLANKING-CLAMPS.

Specification forming part of Letters Patent No. 166,524, dated August 10, 1875; application filed June 5, 1875.

*To all whom it may concern:*

Be it known that I, JAMES HASTINGS, of Elizabethport, in the county of Union and State of New Jersey, have invented a new and useful Improvement in Planking-Clamps, of which the following is a specification:

Figure 1 is a side view of my improved clamp, illustrating its use. Fig. 2 is a top view of the same, partly in section through the line $x$ $x$, Fig. 1. Fig. 3 is a detail section taken through the line $y$ $y$, Fig. 1.

Similar letters of reference indicate corresponding parts.

The object of this invention is to furnish an improved clamp designed especially for forcing the planks to their places in planking vessels, but which may be used for various other purposes, and which shall be simple in construction, convenient in use, and effective in operation.

The invention consists in the hooks, pivoted to each other by a bolt, and having their lower or pronged ends branched; in the combination of the bent bar, the two screws arranged at right angles with each other, the branched hooks, the pivoting-bolt, and the locking-bolt with each other; and in the combination of the grooved bar and the pivoted cross-head with the two screws, the bar, and the hooks, as hereinafter fully described.

A is a bar of convenient length, and of such a size as will give it the requisite strength. The bar A is bent edgewise at right angles near one end, as shown in Fig. 1. In the ends of the bar A are formed screw-holes to receive the screws B C, which will thus stand at right angles with each other. In the bar A, at a little distance from the end of its long arm, is formed a short longitudinal slot to receive the shanks of the hooks D, which pass through the said slot from the opposite sides of the bar A, and are pivoted in place and to each other by a bolt, E. The lower ends of the hooks D are made with two arms or branches, $d'$, upon the inner sides of the ends of which are formed points or claws to sink into the ribs or other timbers. In the upper ends of the hooks D are formed holes, through which is passed a bolt, F. The bolt F also passes through the slot in the bar A, and has a lever or crank nut, $f'$, screwed upon its end, so that by turning up the crank-nut $f'$, the hooks D may be locked upon the timber.

In using the clamp for planking a vessel, the plank is placed upon the ribs in its proper place, or as near it as possible. The hooks D are then secured to the rib in such a position that the forward end of the screw B may rest against the outer side of the plank. The screw B is then turned forward to force the plank against the ribs, which brings its outer edge opposite the forward end of the screw C. The screw C is then turned forward to force the inner edge of the plank close up against the edge of the preceding plank, and the said plank is then spiked to the ribs. To the forward end of the screw B is pivoted or swiveled a short cross-head, G, which is made dovetailed in form, and fits and slides in a dovetailed groove in the bar H. The inner face of the bar H is toothed or roughened, so that it will not slip upon the plank.

With this construction, when the screw C is operated to force the plank edgewise against the edge of the preceding plank, the grooved bar H moves with the plank and slides upon the cross-head G, and thus prevents the screw B from being strained or bent.

By detaching the bolts E F, removing the hooks D from the bar A, and again connecting the said hooks by the bolt E, the device D E may be used as a timber-hook, and will have this great advantage over other timber-hooks, that it does not require to be so accurately centered, as it will be sufficient if the center of gravity comes anywhere within the forks or branches $d'$.

Having thus described my invention, I claim as new and desire to secure by Letters Patent—

1. The hooks D, pivoted to each other by a bolt, E, and having their lower or pronged ends branched, substantially as herein shown and described.

2. The combination of the bent bar A, the two screws B C, arranged at right angles with each other, the branched hooks D, the pivoting-bolt E, and the locking-bolt F, with each other, substantially as herein shown and described.

3. The combination of the grooved bar H and the pivoted cross-head G with the screws B C, the bar A, and the hooks D, substantially as herein shown and described.

JAMES HASTINGS.

Witnesses:
JAMES T. GRAHAM,
T. B. MOSHER.